US012635604B2

(12) United States Patent (10) Patent No.: US 12,635,604 B2
Brune (45) Date of Patent: May 26, 2026

(54) COMBINE WITH A BYPASS DEVICE

(71) Applicant: CLAAS Selbstfahrende Erntemaschinen GmbH, Harsewinkel (DE)

(72) Inventor: Markus Brune, Harsewinkel (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 768 days.

(21) Appl. No.: 18/072,156

(22) Filed: Nov. 30, 2022

(65) Prior Publication Data

US 2023/0172105 A1 Jun. 8, 2023

(30) Foreign Application Priority Data

Dec. 8, 2021 (DE) ..................... 10 2021 132 278.2

(51) Int. Cl.
*A01D 41/127* (2006.01)
*A01D 61/00* (2006.01)

(52) U.S. Cl.
CPC ..... *A01D 41/1272* (2013.01); *A01D 41/1275* (2013.01); *A01D 41/1277* (2013.01); *A01D 61/00* (2013.01)

(58) Field of Classification Search
CPC ........ A01D 41/00–41/16; A01D 61/00; A01D 41/1272; A01D 41/1275; A01D 41/1277
See application file for complete search history.

(56) References Cited

U.S. PATENT DOCUMENTS

| | | | |
|---|---|---|---|
| 4,403,191 A * | 9/1983 | Satake | G01N 33/10 324/452 |
| 5,448,069 A | 9/1995 | Tobler et al. | |
| 5,616,851 A | 4/1997 | Mcmahon et al. | |
| 6,100,526 A | 8/2000 | Mayes | |
| 6,155,103 A | 12/2000 | Diekhans et al. | |
| 6,282,967 B1 * | 9/2001 | Homburg | A01D 41/1272 73/861 |
| 6,285,198 B1 | 9/2001 | Nelson et al. | |
| 6,327,899 B1 | 12/2001 | Diekhans et al. | |

(Continued)

FOREIGN PATENT DOCUMENTS

| | | |
|---|---|---|
| DE | 4105857 A1 | 8/1992 |
| DE | 19544057 A1 | 5/1997 |

(Continued)

OTHER PUBLICATIONS

European Search Report for European application No. 22202682.5-1105 mailed Apr. 14, 2023.
U.S. Appl. No. 17/985,389, filed Nov. 11, 2022.

*Primary Examiner* — Joseph M Rocca
*Assistant Examiner* — Madeline I Runco
(74) *Attorney, Agent, or Firm* — Lempia Summerfield Katz LLC

(57) ABSTRACT

A self-propelled combine configured to collect and handle harvested material and a method for operating the self-propelled combine are disclosed. The combine may include a bypass device that includes an optical measuring device configured to determine one or more harvested material properties of the partial flow of harvested material. The bypass device may have at least one capacitive measuring device for determining the harvested material properties of the partial flow of harvested material.

20 Claims, 4 Drawing Sheets

(56)           References Cited

U.S. PATENT DOCUMENTS

| | | | |
|---|---|---|---|
| 6,483,583 B1 * | 11/2002 | Wright | G01J 3/2803 |
| | | | 460/7 |
| 6,559,655 B1 * | 5/2003 | Rosenthal | G01N 21/3563 |
| | | | 250/252.1 |
| 6,686,749 B2 | 2/2004 | Rains et al. | |
| 6,791,683 B2 * | 9/2004 | Sjodin | G01N 21/3563 |
| | | | 356/244 |
| 6,845,326 B1 | 1/2005 | Panigrahi et al. | |
| 9,964,484 B2 * | 5/2018 | Haiges | G01N 21/359 |
| 10,188,036 B2 | 1/2019 | Loukili et al. | |
| 11,160,208 B2 * | 11/2021 | Temple | G01N 25/56 |
| 11,197,417 B2 | 12/2021 | Corban et al. | |
| 11,589,510 B2 | 2/2023 | Shinners et al. | |
| 2002/0133309 A1 * | 9/2002 | Hardt | A01D 41/1277 |
| | | | 702/129 |
| 2009/0074243 A1 | 3/2009 | Missotten et al. | |
| 2009/0258684 A1 * | 10/2009 | Missotten | G01N 21/55 |
| | | | 460/5 |
| 2009/0291723 A1 * | 11/2009 | Missotten | G01N 21/85 |
| | | | 460/22 |
| 2011/0086684 A1 * | 4/2011 | Luellen | G01N 1/04 |
| | | | 460/149 |
| 2011/0151952 A1 * | 6/2011 | Kormann | A01D 41/1277 |
| | | | 460/114 |
| 2012/0004815 A1 * | 1/2012 | Behnke | A01D 41/1277 |
| | | | 701/50 |
| 2012/0218403 A1 | 8/2012 | Beaty et al. | |
| 2013/0000393 A1 * | 1/2013 | Cash | A01D 41/1277 |
| | | | 73/74 |
| 2017/0112056 A1 * | 4/2017 | Sierra | A01D 61/00 |
| 2017/0112057 A1 * | 4/2017 | Loukili | A01D 41/127 |
| 2018/0000011 A1 * | 1/2018 | Schleusner | G01S 13/87 |
| 2021/0298235 A1 | 9/2021 | Beulke et al. | |
| 2022/0000006 A1 | 1/2022 | Wieckhorst et al. | |
| 2022/0057322 A1 | 2/2022 | Fischer et al. | |
| 2022/0132736 A1 * | 5/2022 | Meyers | A01D 41/1277 |
| | | | 460/7 |
| 2022/0375115 A1 * | 11/2022 | Missotten | G06T 7/0004 |
| 2024/0365706 A1 * | 11/2024 | Pflederer | A01D 61/00 |

FOREIGN PATENT DOCUMENTS

| | | | | |
|---|---|---|---|---|
| DE | 19744481 A1 | 4/1999 | | |
| EP | 2036424 A2 | 3/2009 | | |
| EP | 2168419 A1 * | 3/2010 | | A01D 41/1277 |
| EP | 2401906 A1 | 1/2012 | | |

* cited by examiner

COMBINE WITH A BYPASS DEVICE

REFERENCE TO RELATED APPLICATIONS

This application claims priority under 35 U.S.C. § 119 to German Patent Application No. 10 2021 132 278.2 filed Dec. 8, 2021, the entire disclosure of which is hereby incorporated by reference herein. This application is further related to U.S. application Ser. No. 17/985,389, which is incorporated by reference herein in its entirety.

TECHNICAL FIELD

The present invention relates to a self-propelled combine and a method of operating the combine.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Self-propelled combines typically have a grain elevator for conveying a flow of harvested material from a conveying and cleaning device of the combine to a grain tank of the combine. U.S. Pat. Nos. 6,155,103 and 6,327,899, both of which are incorporated by reference herein in their entirety, disclose, for example, a bypass device arranged or positioned on the grain elevator, through which a partial flow of harvested material of the harvested material flow, guided through the grain elevator, is guided, and whereby the bypass device has a moisture sensor for measuring moisture.

BRIEF DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

Figure 1:
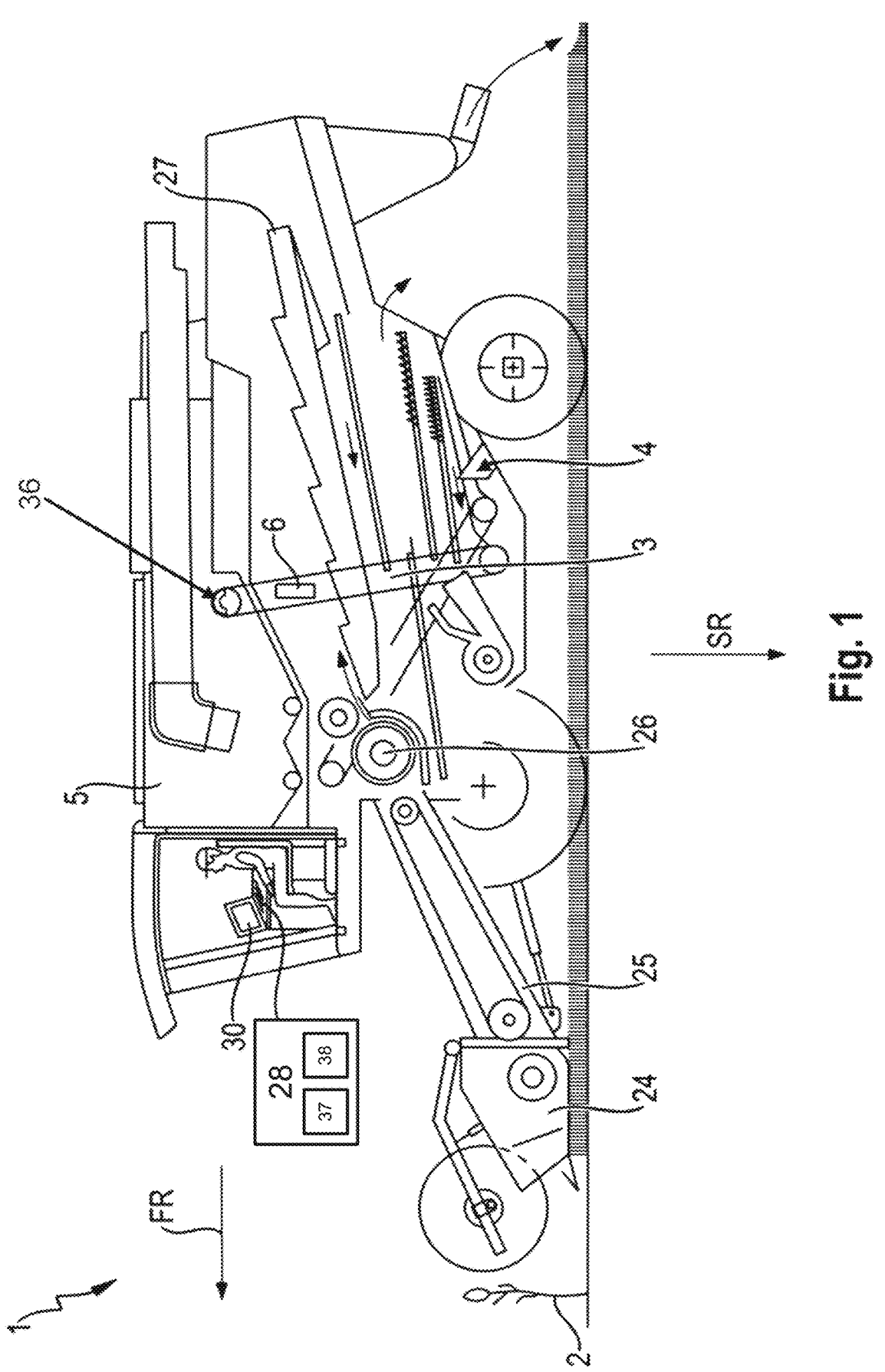
FIG. 1 shows a self-propelled combine.

As discussed in the background, a self-propelled combine may have a bypass device. In one or some embodiments, an improved, or at least an alternative, self-propelled combine having a bypass device is disclosed.

In one or some embodiments, the self-propelled combine, which may be configured to picking up (or collect) and/or handle harvested material, comprises a grain elevator for conveying a flow of harvested material from a conveying and cleaning device of the combine to a grain tank of the combine. In so doing, a bypass device may be arranged or positioned at the grain elevator in such a way that a partial flow of harvested material of the flow of harvested material guided through the grain elevator flows into the bypass device. The bypass device is configured to guide a partial flow of harvested material. The partial flow of harvested material may flow from the grain elevator into the bypass device and then flow through it, wherein the partial flow of harvested material flows back into the grain elevator after flowing through the bypass device.

In one or some embodiments, the bypass device has an optical measuring device configured to determine one or more harvested material properties, such as determining one or more constituents, of a partial flow of harvested material. Alternatively, or in addition, the bypass device has at least one capacitive measuring device for determining the one or more harvested material properties of the partial flow of harvested material. The optical measuring device may be designed for determining constituents of a partial flow of harvested material. Alternatively, or in addition, the capacitive measuring device may be designed for determining constituents of the partial flow of harvested material.

The optical measuring device may be used, for example, to determine any one, any combination, or all of: the water mass; the protein mass; the carbohydrate mass; the fat mass; or the oil mass of the partial flow of harvested material. For this purpose, the measuring device may have a light source which illuminates the partial flow of harvested material as it flows through the measuring device.

Furthermore, the measuring device may detect mass-proportional absorption spectra using one or more sensors, such as a near-infrared sensor and/or a silicon detector, which may generate measurement data, and determine the water mass, the protein mass, the carbohydrate mass, and/or the fat mass, and/or the oil mass of the partial flow of harvested material on the basis of these measurement data. In this way, the composition of the ingredients and/or the properties of the flow of harvested material guided through the grain elevator may be determined based on the mass-proportional absorption spectra of the partial flow of harvested material. Various harvested material properties may be determined. As one example, a moisture value of the partial flow of harvested material may, for example, be determined from the harvest material characteristics determined by the optical measuring device and/or the determined constituents. The moisture value may be proportional, such as linearly proportional, to the water mass of the partial flow of harvested material.

A capacitive measuring device of the bypass device may have a plurality (such as two) electrodes at a distance from each other. These electrodes may be arranged or positioned in the bypass device. In this case, two electrodes arranged or positioned at a distance from each other may form a capacitor whose electrical capacitance is measurable using the capacitive measuring device. Since the capacitive measuring device is formed in the bypass device, the cross-sectional distribution of the conveyed partial flow of harvested material may be constant, or constant over time, in comparison to the cross-sectional distribution of the harvested material in the grain elevator. In other words, the region of the bypass device, in which the electrodes of the capacitive measuring device are arranged or positioned, may be designed such that a constant fill level of this region of the bypass device is achieved with the partial flow of harvested material. Such a constant cross-sectional distribution of the conveyed partial flow of harvested material and/or a constant fill level results, for example, because a small amount of the harvested material (e.g., the partial flow of harvested material) unproblematically completely fills the region of the bypass device in which the electrodes are arranged, whereas the flow of harvested material fills the grain elevator in many cases only partially and/or varying over time. In other words, the region of the bypass device in which the electrodes of the capacitive measuring device are arranged or positioned is formed, such as formed by the geometric design, in such a way that the partial flow of harvested material may completely fill this region of the bypass device. A constant, such as full and/or completely full, volume of the partial flow of harvested material may therefore be measured with the capacitive measuring device.

The electrical capacitance of the capacitor of the capacitive measuring device therefore may depend on the cross-sectional distribution of the conveyed partial flow of harvested material, and the moisture of the conveyed partial flow of harvested material, and the density of the conveyed partial flow of harvested material, but the cross-sectional distribution of the conveyed partial flow of harvested material in the bypass device may be constant that does not vary over time. Therefore, the electrical capacitance of the capacitor of the capacitive measuring device may only vary as a function of the humidity of the conveyed partial flow of harvested material, and the density of the conveyed partial flow of harvested material.

The combine may, for example, have an evaluation unit that receives and/or requests the measurement data from the optical measurement device and measurement data from the capacitive measurement device. As discussed further below, the evaluation unit may comprise any type of computing functionality that is resident on the combine. The evaluation unit may be designed to determine a moisture value of the partial flow of harvested material of the bypass device from the measurement data of the optical measurement device, and to use this moisture value and the measurement data of the capacitive measurement device (e.g., the electrical capacitance) to determine a weight, such as a hectoliter weight, of the partial flow of harvested material of the bypass device. In one or some embodiments, the hectoliter weight may be classified as an additional quality parameter of the harvested material in addition to the moisture, so that a better classification is made possible. In one or some embodiments, the evaluation unit may be designed in such a way that the of the hectoliter weight of the partial flow of harvested material is only determined after a certain fixed period of time after an agricultural task is started or begun by the combine in order to ensure sufficient filling of the bypass device with the partial flow of harvested material.

In one or some embodiments, the bypass device has a collecting container configured to collect the partial flow of harvested material, wherein the capacitive measuring device is arranged or positioned in and/or on the collecting container. "Collecting" may be understood as the partial flow of harvested material has a continuous throughput through the collecting container, wherein the partial flow of harvested material flows into the collecting container, flows through the collecting container and then flows out of the collecting container, wherein the collecting container may be designed in such a way that an inflow velocity and/or inflow quantity per unit time of the partial flow of harvested material into the collecting container is greater than an outflow velocity and/or outflow quantity per unit time of the partial flow of harvested material out of the collecting container. In other words, the collecting container may form a reservoir, such as a reservoir completely filled with a partial flow of harvested material, with a continuous throughput of the partial flow of harvested material.

In one or some embodiments, the collecting container has at least one fill level sensor unit configured to detect the fill level of the partial flow of harvested material in the collecting container. The fill level sensor unit may transmit the fill level of the partial flow of harvested material in the collecting container to the evaluation unit of the combine harvester. In one or some embodiments, the evaluation unit only performs the determination of the hectoliter weight responsive to the fill level of the partial flow of harvested material (as indicated by the fill level sensor) indicates that a constant cross-sectional distribution of the conveyed partial flow of harvested material and/or a constant degree of filling is present.

In one or some embodiments, the combine has a yield measuring device for measuring the yield of the flow of harvested material. The yield measuring device may be arranged or positioned in and/or on the grain elevator, and may be arranged or positioned at a distance (such as a predetermined distance) from the bypass device. The yield measuring device may be formed separately with respect to the bypass device.

In one or some embodiments, the yield measuring device is formed between the bypass device and the grain tank. In other words, the yield measuring device may be arranged or positioned in and/or at the grain elevator, but is positioned behind the bypass device with respect to a direction of movement of the flow of harvested material from the conveying and cleaning device to the grain tank.

In one or some embodiments, the yield measuring device is one or more of an optical yield measuring device, a force-based yield measuring device, or a capacitive measuring device.

The optical yield measuring device may be a light barrier for yield measurement. It may be provided here that the yield measurement of the optical yield measurement device includes the hectoliter weight of the partial flow of harvested material of the bypass device in order to improve and/or optimize the result of the yield measurement.

In one or some embodiments, the force-based yield measuring device may be a baffle plate, such as for mass determination, wherein the hectoliter weight of the partial flow of harvested material may be used in one of several ways, such as to improve or optimize a grain tank fill level indicator on a display of the self-propelled combine.

In one or some embodiments, the yield measuring device, which may be designed as a capacitive measuring device, is a different capacitive measuring device compared to the capacitive measuring device of the bypass device. In contrast to measurements of the capacitive measuring device of the bypass device, any one, any combination, or all of the cross-sectional distribution of the conveyed flow of harvested material, the degree of filling of the grain elevator, or the volume of the flow of harvested material conveyed through the grain elevator, changes (e.g., changes over time) in the yield measuring device. The evaluation unit of the combine harvester may be designed in such a way that a moisture value of the partial flow of harvested material of the bypass device is determined from the measurement data of the optical measuring device, and a hectoliter weight of the partial flow of harvested material of the bypass device is determined with this moisture value and from the measurement data of the capacitive measuring device of the bypass device. Thus, the evaluation unit may determine at least one aspect of the yield, such as the conveyed mass, of the flow of harvested material from measurement data of the capacitive yield measuring device (e.g. the electrical capacitance), and from the moisture value of the bypass device, and from the hectoliter weight of the bypass device.

In one or some embodiments, the bypass device has a screw conveyor configured to convey the partial flow of harvested material to the optical measuring device. The bypass device may have a feed opening through which the partial flow of harvested material flows into the bypass device starting from the grain elevator. In so doing, the partial flow of harvested material may flow into the screw conveyor. For this purpose, a feed opening may be arranged or positioned above part of the screw conveyor so that the partial flow of harvested material flows substantially along the direction of gravity under the force of gravity, and flows into the screw conveyor through an inflow opening. The collecting container for collecting the partial flow of harvested material may be arranged or positioned at least partially between the feed opening and the screw conveyor, wherein the partial flow of harvested material flows via the feed opening, flows through the collecting container, and then flows into the screw conveyor via the inflow opening.

The screw conveyor may convey the fed partial flow of harvested material to the optical measuring device. In this case, the screw conveyor may be designed and/or aligned in the bypass device in such a way that the partial flow of harvested material conveyed through the screw conveyor leaves via an outflow opening and flows in the direction of the optical measuring device. In this case, the inflow opening may be arranged or positioned below the outflow opening with respect to the direction of gravity. In other words, the partial flow of harvested material in the screw conveyor may be conveyed upwards. Using the screw conveyor, a continuous and uniform supply of the partial flow of harvested material to the optical measuring device may be ensured so that the optical measuring device may perform optimal measurements. In one or some embodiments, the conveyance of the inflowing partial flow of harvested material within the screw conveyor may occur along a main conveying direction.

In one or some embodiments, the screw conveyor may have an intermediate opening formed downstream from the discharge opening with respect to the main conveying direction, wherein part of the partial flow of harvested material which has not flowed into the discharge opening may flow back into the grain elevator via this intermediate opening.

The screw conveyor may have a drive, such as any one, any combination, or all of: a hydraulic drive; and electric drive; or a mechanical drive.

In one or some embodiments, the bypass device has a feed opening through which the partial flow of harvested material from the grain elevator may flow into the bypass device.

Alternatively or additionally, the bypass device may have an outlet opening through which the partial flow of harvested material may flow into the grain elevator after flowing through the optical measuring device.

Alternatively or additionally, the bypass device may have an intermediate opening through which the partial flow of harvested material may flow into the grain elevator.

In one or some embodiments, the collecting container configured to collect the partial flow of harvested material is formed between the feed opening and the screw conveyor. The partial flow of harvested material may enter the collecting container via the feed opening, flow through the collecting container, and then flow out of the collecting container into the screw conveyor.

In one or some embodiments, the collecting container has an at least sectional channel taper between the feed opening and the screw conveyor. The collecting container therefore has a taper in the direction of the screw conveyor, such as a cross-sectional taper. Through the collecting container, the quantity of the partial flow of harvested material may be guided with reduced fluctuations to the screw conveyor and consequently with reduced fluctuations to the optical measuring device. This may allow complete filling and/or constant filling of the collecting tank over time by the partial flow of harvested material to be supported and/or optimized.

In one or some embodiments, the capacitive measuring device of the bypass device is arranged or positioned in and/or on the channel taper of the collecting container. This may allow complete filling and/or constant filling of the collecting tank over time with the partial flow of harvested material to be supported and/or optimized with respect to the capacitive measuring device.

In one or some embodiments, the bypass device has a feed tube for guiding the partial flow of harvested material from the screw conveyor to the optical measuring device, wherein the optical measuring device has a tube, such as a transparent tube and/or an optically transparent tube, for guiding the partial stream of the flow of harvested material for determining harvested material properties of the partial flow of harvested material. The tube may be a glass tube, such as any one, any combination, or all of a transparent glass tube, an optically transparent glass tube, or a wooden tube, such as a transparent wooden tube and/or an optically transparent wooden tube. Glass may be a non-crystalline solid, such as a transparent amorphous solid. The feed tube may be formed separately with respect to the screw conveyor and/or separately with respect to the optical measuring device. In terms of flow, the feed tube may be arranged or positioned between the screw conveyor and the optical measuring device in such a way that the partial flow of harvested material from the screw conveyor flows into the feed tube, flows through the feed tube, and then flows into the optical measuring device. The region of the screw conveyor from which the partial flow of harvested material exits may be arranged or positioned above the feed tube so that the partial flow of harvested material, in addition to the speed of the screw conveyor, also flows under the force of gravity substantially along the direction of gravity.

In one or some embodiments, the tube of the optical measurement device may be substantially transparent to light radiation from the optical measurement device light source, and/or substantially transparent to radiation detected and/or measured by the optical measurement device sensor.

In one or some embodiments, the bypass device is configured for cleaning the tube of the optical measuring device and for ensuring an empty state of (or for removing harvested material from) the tube of the optical measuring device. In one or some embodiments, the bypass device performs a cleaning of the tube before ensuring the empty state of the tube (or responsive to determining to remove harvested material from the tube).

In one or some embodiments, the optical measuring device may be designed in such a way that it may detect and/or determine, such as detect and/or determine by sensor (s), that the optical measuring device should be cleaned and/or referenced. For this purpose, the sensor of the optical measuring device may independently determine a plurality of different references (such as two different references) without the white standard being introduced into the optical measuring device. For example, these two different references may comprise a "dark reference" and a "white reference". With the "dark reference", the light source of the optical measuring device may be turned off, and there is no harvested material in the optical measuring device. With the "white reference", the light source of the optical measuring device is on, and there is no harvested material in the optical measuring device. Based on these two references, a changed characteristic of the light source caused by aging may be eliminated or calculated out, or a slight fouling or error of a glass bulb in the optical measuring device may be eliminated/removed or calculated out. Therefore, when the light source ages and/or the glass bulb becomes slightly dirty, the optical measuring device may still be used and/or utilized with sufficient reliability. For such referencing of the optical measuring device, the bypass device may ensure that the tube is in an empty state. For sufficient, such as good, referencing, a reference measurement may be performed at regular intervals.

Furthermore, in certain harvesting conditions, it may be warranted to clean the tube. This may be done with a cylinder, the piston rod of which may be pushed through the tube. For this purpose, a cleaning element may be arranged or positioned on the piston rod. In particular, the cleaning element may be arranged or positioned at the end of the piston rod. For example, the cleaning element may be designed as a brush-like attachment. A brush-like attachment may be designed like any one, any combination, or all of: a broom; a wire brush; or a "pipe cleaner".

In one or some embodiments, the optical measuring device may be designed to detect that there is a blockage of the tube which cannot be removed by the optical measuring device, but must be removed manually. In such a case, the optical measuring device may, for example, inform the operator of the combine (e.g., via a display installed on the combine) regarding the blockage and/or request the operator of the combine to manually remove the blockage of the tube.

In order to ensure the empty state of the tube, the screw conveyor may perform a reverse rotation of its screw, such as for a predefined short period of time, in order to block the entry of the partial flow of harvested material into the tube.

In one or some embodiments, in order to ensure the empty state of the tube, the bypass device may have a first cylinder with a movable piston rod and, for cleaning the tube, a second cylinder with a movable piston rod, wherein the first cylinder may be designed separately from the second cylinder.

In one or some embodiments, the bypass device may include an additional sample inlet and an additional sample outlet to measure a grain sample that has not been harvested by the combine. In this regard, the bypass device may ensure that the tube of the optical measuring device is empty, so that no partial flow of harvested material harvested by the combine may flow into the tube, but the grain sample may be introduced into the tube via the additional sample inlet. The bypass device may perform a cleaning of the tube before ensuring the empty state of the tube. For this purpose, the additional sample inlet may be arranged or positioned above the tube of the optical measuring device so that the grain sample flows substantially along the direction of gravity under the force of gravity and may pass through the tube. Subsequently, the grain sample may flow out of the optical measuring device via the additional sample outlet, wherein the additional sample outlet is arranged or positioned below the tube of the optical measuring device so that the grain sample flows substantially along the direction of gravity under gravity and exits the tube. Since no active conveyance of material is required in so doing, it may be unnecessary, for example, for the drive and/or screw conveyor of the combine to be active. This system may be used to measure a sample or grain sample with known contents in order to perform an offset correction of the sensor of the optical measuring device.

By using a bypass device designed to clean the tube of the optical measuring device and to ensure that the tube of the optical measuring device is empty, the operating time of the optical measuring device may be maximized so that, for example, maintenance costs and/or spare parts costs may be reduced.

In one or some embodiments, the bypass device has a cylinder device with a movable piston rod for cleaning the tube of the optical measuring device and for ensuring an empty state of the tube of the optical measuring device. In other words, the bypass device may have only or exactly one cylinder device that is designed for cleaning the tube and ensuring an empty state of the tube. The bypass device, such as the arrangement and/or orientation of the optical measuring device, in particular the tube, and the screw conveyor and the one cylinder device, may be designed such that the one cylinder device is designed to clean the tube of the optical measuring device and to ensure an empty state of the tube of the optical measuring device. In this regard, it may be understood that cleaning the tube of the optical measuring device and ensuring an empty state of the tube need not occur simultaneously, but rather, for example, the tube may first be cleaned and then an empty state of the tube is ensured. It may also be provided that the one cylinder device only ensures that the tube is empty or only that the tube is cleaned.

Since only one cylinder device and no other one is required, the manufacturing costs of the bypass device may be reduced, the required installation space for the bypass device may be reduced and, in addition, the overall weight of the bypass device may be optimized.

In one or some embodiments, at least a part of the piston rod, such as an end face of the piston rod, may assume at least one opening position in which the screw conveyor, the feed tube and the tube are connected to each other for guiding the partial flow of harvested material in such a way that a partial flow of harvested material conveyed by the screw conveyor substantially flows into the feed tube and subsequently flows through the tube. In other words, the piston rod may assume one or more open positions in which the flow of the partial flow of harvested material is not affected or attenuated by the piston rod. In such a case, the piston rod may be arranged or positioned outside a flow path leading from the screw conveyor to the feed tube.

Alternatively or additionally, at least a part of the piston rod, such as the end face of the piston rod, may assume at least one intermediate position in which at least a part of the piston rod suppresses the partial flow of harvested material from the screw conveyor to the tube, so that a partial flow of harvested material originating from the screw conveyor does not flow into the tube of the optical measuring device. In other words, the piston rod may adopt one or more intermediate positions in which the partial flow of harvested material starting from the screw conveyor cannot flow into the tube of the optical measuring device. Therefore, the piston rod, such as a cleaning element, may seal the tube with respect to the screw conveyor. The intermediate position of the piston rod, such as the end face of the piston rod, may be a position within the feed tube.

In this regard, the piston rod may at least partially pass through the screw conveyor so that, in such an embodiment, the screw conveyor stops conveying and, for example, the position of the screw turns is aligned such that the piston rod may be moved without friction between the screw turns of the screw conveyor.

In this case, the piston rod does not pass through the screw conveyor so that, at each intermediate position of the piston rod, the screw conveyor may continue to convey, but the partial flow of harvested material cannot flow into the tube. In this case, the partial flow of harvested material may flow back into the grain elevator via the intermediate opening, for example. However, even in this case, it may be provided that the screw conveyor stops conveying even though the piston rod does not negatively affect the basic operation of the screw conveyor.

Alternatively or additionally, at least a part of the piston rod, such as the end face of the piston rod, may assume at least one end position in which at least a part of the piston rod is arranged or positioned in an end opening of the tube of the optical measuring device. Cleaning and/or draining of the tube may thereby be performed. The end opening of the tube may be the opening of the tube from which the crop partial stream flows out.

In one or some embodiments, the piston rod has a cleaning element, such as a brush-like cleaning element. In particular, the cleaning element may be arranged or positioned at the end of the piston rod. For example, the cleaning element may be designed as a brush-like attachment. A brush-like attachment may be formed like any one, any combination, or all of: a broom; a wire brush; a "tube cleaner"; or a sponge. The cleaning element may be formed starting from the end face of the piston rod. Cleaning of the tube may be optimally performed with a cleaning element so that the service life of the optical measuring device is increased, and/or the measuring accuracy is optimized.

In one or some embodiments, the bypass device has a displacement measuring device for determining the position of at least a part of the piston rod, such as the end face and/or the cleaning element, in order to enable precise positioning of at least a part of the piston rod, such as the end face and/or the cleaning element. In particular, the displacement measuring device may be used to guide at least a part of the piston rod, such as the end face and/or the cleaning element, specifically to an intermediate position so that the partial flow of harvested material conveyed by the screw conveyor does not flow into the tube of the optical measuring device.

Alternatively or additionally, the bypass device comprises a device for time-controlled position change of at least a part of the piston rod, such as the end face and/or of the cleaning element, in order to enable precise positioning of the piston rod, in particular the end face and/or the cleaning element. In particular, the time-controlled change in position is used to guide at least a part of the piston rod, in particular the end face and/or the cleaning element, specifically to an intermediate position so that the partial flow of harvested material conveyed by the screw conveyor does not flow into the tube of the optical measuring device.

Alternatively or additionally, the bypass device has a sensor and/or a switch in the feed tube for detecting the presence of at least a part of the piston rod, such as the end face and/or the cleaning element, in order to enable an accurate positioning of at least a part of the piston rod, such as the end face and/or the cleaning element. The sensor and/or the switch may be positioned in the feed tube. In one or some embodiments, the switch may be a proximity switch. In one or some embodiments, the sensor may be an inductance sensor. For example, the piston rod (under the command of the controller) may move in the direction of the optical measuring device, wherein this movement is stopped when the sensor and/or the switch detects the piston rod. Based on this detection, the movement of the piston rod (under the command of the controller) may be stopped.

In one or some embodiments, the optical measuring device is designed to determine the position of at least a part of the piston rod, such as the end face and/or the cleaning element, within the tube, in order to enable precise positioning of at least a part of the piston rod, such as the end face and/or the cleaning element. Based on the absorption spectrum generated by the piston rod, such as the end face and/or the cleaning element, the optical measuring device may detect whether at least a part of the piston rod, such as the end face and/or the cleaning element, is located within the tube. After this detection, the piston rod may be moved out of the tube until at least a part of the piston rod, such as the end face and/or the cleaning element, is no longer in the tube. The fact that the at least a part of the piston rod, such as the end face and/or the cleaning element, is no longer in the tube may again be detected by the optical measuring device from the generated absorption spectrum and then may stop, such as immediately and/or instantaneously, the extension movement of the piston rod. Due to the arrangement of the tube, the feed tube and the screw conveyor, the piston rod, such as the end face and/or the cleaning element, may remain in the feed tube so that the partial flow of harvested material cannot flow from the screw conveyor into the tube. In other words, at least a part of the piston rod, such as the end face and/or the cleaning element, may seal the tube with respect to the screw conveyor.

In one or some embodiments, the optical measuring device is designed to determine the position of at least a part of the piston rod, such as the end face and/or the cleaning element, using at least one absorption spectrum. In this way, the position of at least a part of the piston rod, such as the end face and/or the cleaning element, may be determined within the optical measuring device, such as within the tube.

In one or some embodiments, at least a part of the piston rod, such as the end face and/or the cleaning element, has a geometric variation at least in sections. In this way, the piston rod may be designed in such a way that a specific absorption behavior may be assigned to a specific cylinder stroke. A geometric variation may be a geometric change of the material. For example, in addition to a circular cross-section of the piston rod, a triangular cross-section of the piston rod may be formed.

Alternatively or additionally, at least a part of the piston rod, such as the end face and/or the cleaning element, is formed at least sectionally from different materials. Different materials may have different absorption characteristics. This may also be used for additional, more precise multi-point calibration of the sensor.

In one or some embodiments, a method for operating a combine is disclosed, wherein a moisture value of the partial flow of harvested material of the bypass device is determined using the optical measuring device of the bypass device, and an electrical capacitance of the capacitive measuring device of the bypass device is determined, and a weight (such as a hectoliter weight) of the partial flow of harvested material of the bypass device is determined from the determined moisture value and from the determined electrical capacitance. In addition, in one or some embodiments, at least one additional parameter such as a thousand-grain mass may also be included in the determination of the hectoliter weight.

In one or some embodiments, an evaluation unit of the combine may receive and/or retrieve the measurement data of the optical measuring device and measurement data of the capacitive measuring device. The evaluation unit may determine a moisture value of the partial flow of harvested material of the bypass device from the measurement data of the optical measurement device, and to use this moisture value and the measurement data of the capacitive measurement device (e.g., the electrical capacitance) to determine or calculate a hectoliter weight of the partial flow of harvested material of the bypass device.

The evaluation unit of the combine harvester may, for example, transmit the determined hectoliter weight of the harvested partial flow of harvested material by a data link to a computing unit (which may be resident on or connected to the combine). The computing unit may display, via a screen, this information, for example, to an operator of the combine.

Furthermore, as previously described, the evaluation unit may use the moisture value of the partial flow of harvested material and/or the determined hectoliter weight of the partial flow of harvested material together with measured values of a yield measuring device in order to improve and/or enable the yield measurement by the yield measuring device.

In one or some embodiments, the determination of the moisture value of the partial flow of harvested material and/or the determination of the electrical capacitance of the capacitive measuring device may be performed continuously during operation of the combine. By "continuous," it may be understood that the determination of the moisture value of the partial flow of harvested material and/or the determination of the electrical capacitance of the capacitive measuring device may be performed during operation of the combine at regular time intervals and/or in an automated manner.

In one or some embodiments, the determined moisture value and the determined electrical capacitance may each be incorporated linearly for determining the hectoliter weight of the partial flow of harvested material (e.g., incorporating the moisture value and the electrical capacitance linearly). Alternatively, or in addition, the determined moisture value and the determined electrical capacitance are each incorporated quadratically in order to determine the hectoliter weight of the partial (e.g., incorporating the moisture value and the electrical capacitance quadratically). Still alternatively, or additionally to the determined moisture value and the determined electrical capacitance, a plurality of harvested material-dependent prefactors may be incorporated to determine the hectoliter weight of the partial flow of harvested material. In this regard, the hectoliter weight of the partial flow of harvested material is determined by one or more of: incorporating the moisture value and the electrical capacitance linearly; incorporating the moisture value and the electrical capacitance quadratically; or using the moisture value, the electrical capacitance, and a plurality of harvested material-dependent prefactors.

In one or some embodiments, the following formula for calculating the hectoliter weight may be used by way of example,
where "F" is the moisture value of the partial flow of harvested material of the bypass device, wherein "K" is the electrical capacitance of the capacitive measuring device of the bypass device, where the pre-factors "a_1 [ ,a] _2, a_3, a_4" and the constant "C" depend on the type of harvested material. The evaluation unit of the combine may use this formula to determine the hectoliter weight from the measured values of the measuring devices of the bypass device. It may be provided that these prefactors and the constant for different types of harvested material, for example for wheat, barley, etc., are stored in a memory of the evaluation unit of the combine.

Furthermore, the following formula may be used to calculate the hectoliter weight:

$$HLG = a\_1 * F + a\_2 * K + a\_3 * F^2 + a\_4 * K^2 + C +$$
$$a\_5 * TKM + a\_6 * [\![TKM]\!]^2$$

wherein "TKM" is the thousand-grain mass of the partial flow of harvested material of the bypass device, and "a_5, a_6" are additional prefactors. The thousand grain mass may be used as an additional parameter or as an interaction and therefore also as a multiplier.

In one or some embodiments, in the event of a failure of the optical measuring device of the bypass device, a moisture-dependent measured value of the partial flow of harvested material may be determined using the capacitive measuring device of the bypass device. The electrical capacitance of the capacitor of the capacitive measuring device may therefore depend on the cross-sectional distribution of the conveyed partial flow of harvested material, and the moisture of the conveyed partial flow of harvested material, and the density of the conveyed partial flow of harvested material, but the cross-sectional distribution of the conveyed partial flow of harvested material in the bypass device may be a constant value that does not vary over time. Therefore, the electrical capacitance of the capacitor of the capacitive measuring device may only vary as a function of the humidity of the conveyed partial flow of harvested material, and the density of the conveyed partial flow of harvested material. However, it may be the case that the electrical capacitance is more strongly influenced by the moisture of the conveyed partial flow of harvested material than by the density of the conveyed partial flow of harvested material, so that the electrical capacitance of the capacitor of the capacitive measuring device may be classified and/or used alternatively as a moisture-dependent measured value or moisture value of the partial flow of harvested material.

It is understood that the aforementioned features and those to be explained below are usable not only in the combination indicated in each case, but also in other combinations or on their own, without departing from the scope of the present invention.

Referring to the figures, FIG. 1 shows a self-propelled combine 1 for picking up and handling (e.g., processing, conveying, or the like) harvested material 2. An example of a self-propelled combine 1 is disclosed in US Patent Application Publication No. 2021/0298235 A1, incorporated by reference herein in its entirety. The self-propelled combine may include a computer unit 28 having a display screen 30 for an operator of the self-propelled combine 1.

The computer unit 28 may include any type of computing functionality, such as at least one processor 37 (which may comprise a microprocessor, controller, PLA, or the like) and at least one memory 38. The memory 38 may comprise any type of storage device (e.g., any type of memory). Though the processor 37 and the memory 38 are depicted as separate elements, they may be part of a single machine, which includes a microprocessor (or other type of controller) and a memory. Alternatively, the processor 37 may rely on memory 38 for all of its memory needs.

The processor 37 and memory 38 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

When the self-propelled combine 1 is operating, the combine 1 travels in a direction of travel FR through the crop while picking up the harvested material with a cutting unit 24. An inclined conveyor 25 conveys this harvested material 2 to the threshing unit 26. In the threshing unit 26, a separator 27 and a conveying and cleaning device 4 may be configured to separate the grains from the rest of the harvested material so that a flow of harvested material is formed.

The combine 1 may include a grain elevator 3 configured to convey a flow of harvested material from the conveying and cleaning device 4 to a grain tank 5 of the combine 1. In so doing, a bypass device 6 is arranged or positioned at the grain elevator 3 in such a way that a partial flow of harvested material of the flow of harvested material guided through the grain elevator 3 may flow into the bypass device 6. The partial flow of harvested material may thus flow from the grain elevator 3 into the bypass device 6, and subsequently the partial flow of harvested material may flow through the bypass device 6. After which, the partial flow of harvested material may flow back into the grain elevator 3 after flowing through the bypass device 6. Other flows into and/or out of the bypass device 6 are contemplated.

The combine 1 may comprise a yield measuring device 36 configured to measure the yield of the flow of harvested material, wherein the yield measuring device 36 is arranged or positioned in and/or on the grain elevator 3 and is arranged or positioned at a distance from the bypass device 6. For example, this yield measuring device 36 may be formed between the bypass device 6 and the grain tank 5. This yield measuring device 36 may be an optical yield measuring device, a force-based yield measuring device, or a capacitive measuring device (e.g., the same or similar to capacitive measuring device 34). An example of an optical measuring device which may be used as an optical yield measuring device is disclosed in US Patent Application Publication No. 2022/0057322 A1, incorporated by reference herein in its entirety. An example of a force measuring device which may be used as a force-based yield measuring device is disclosed in US Patent Application Publication No. 2022/0000006 A1, incorporated by reference herein in its entirety.

Figure 2:
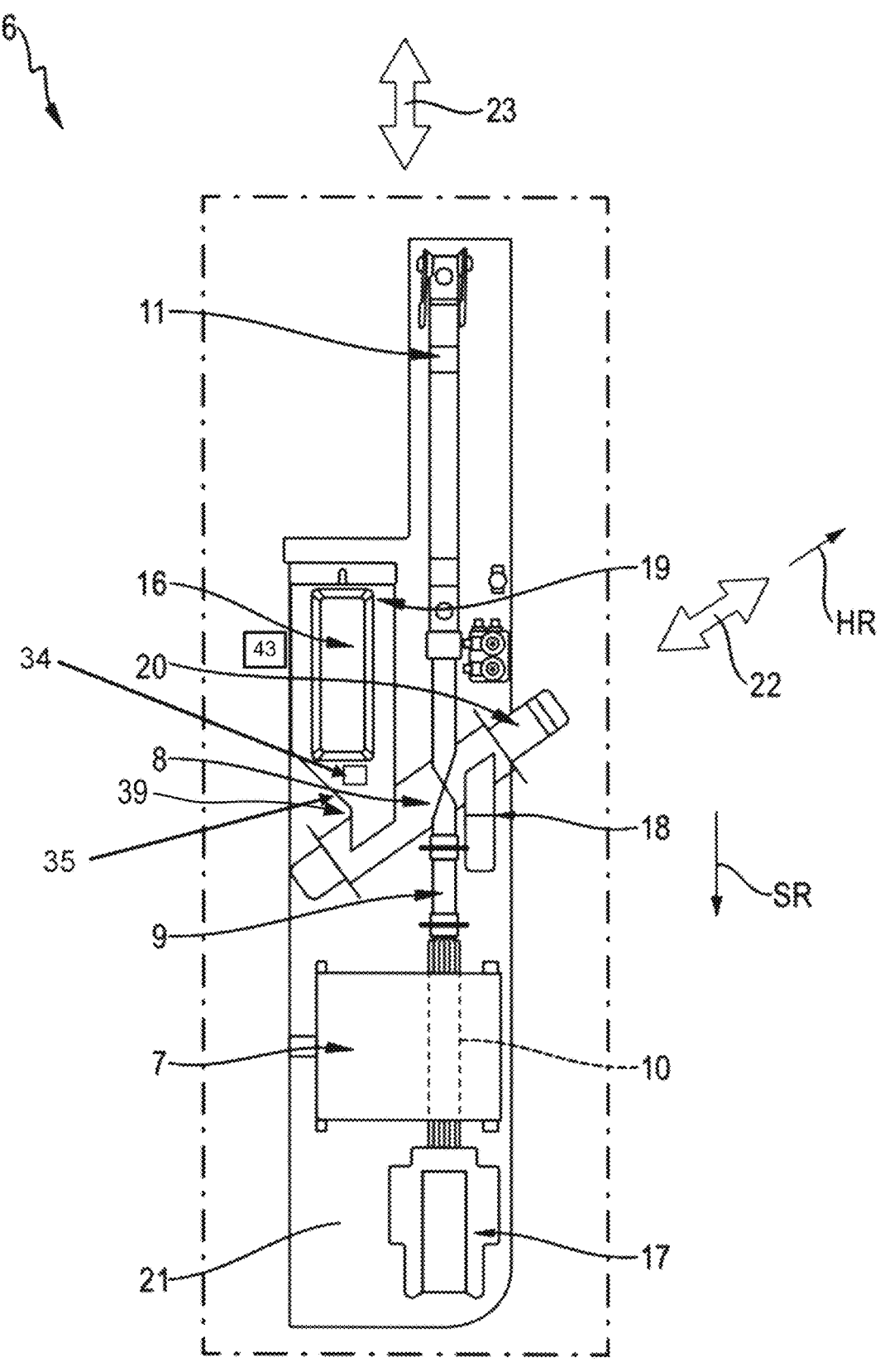
FIG. 2 shows a front view of a bypass device.
Figure 3:
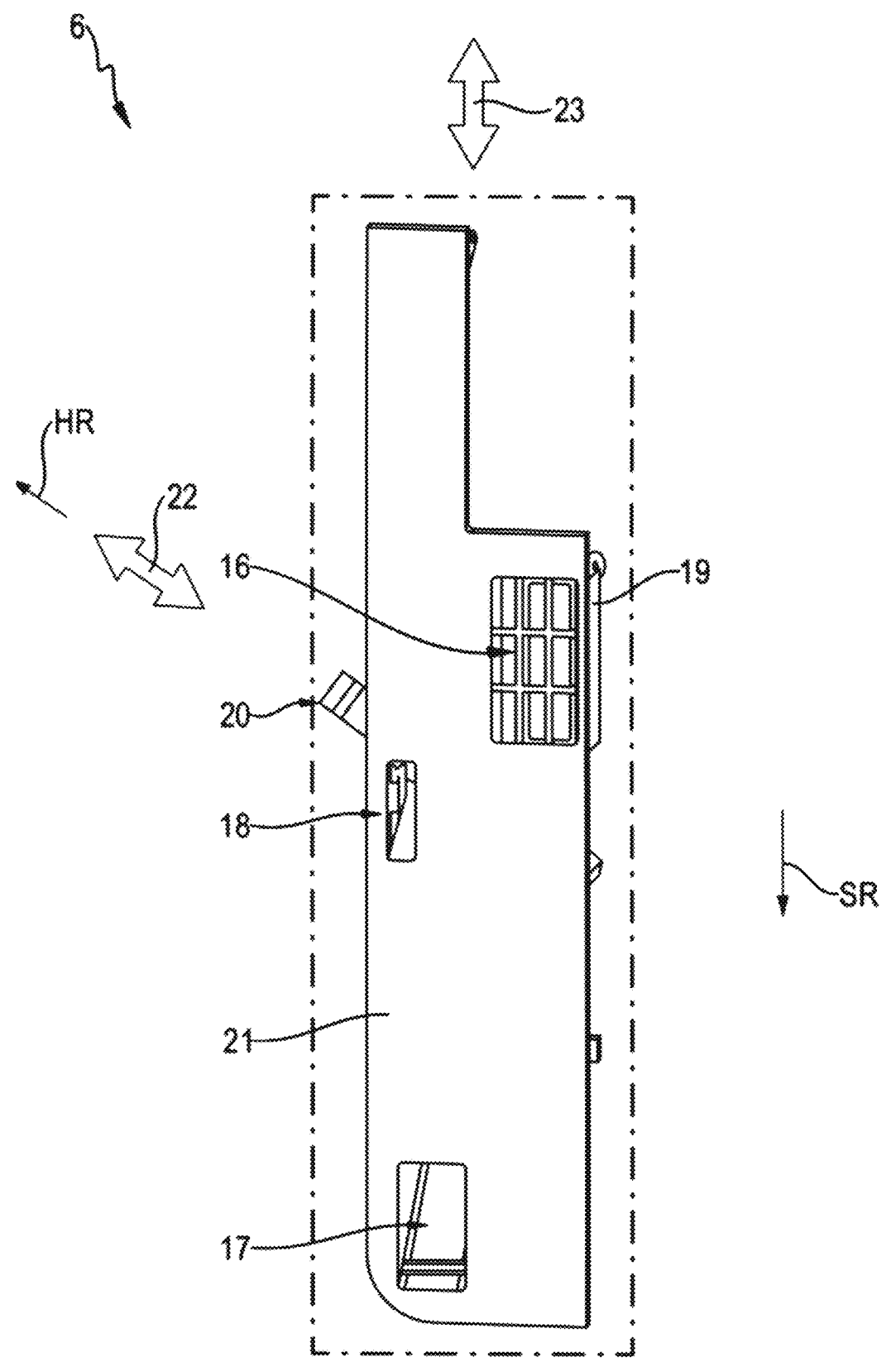
FIG. 3 shows a rear view of the bypass device.
Figure 4:
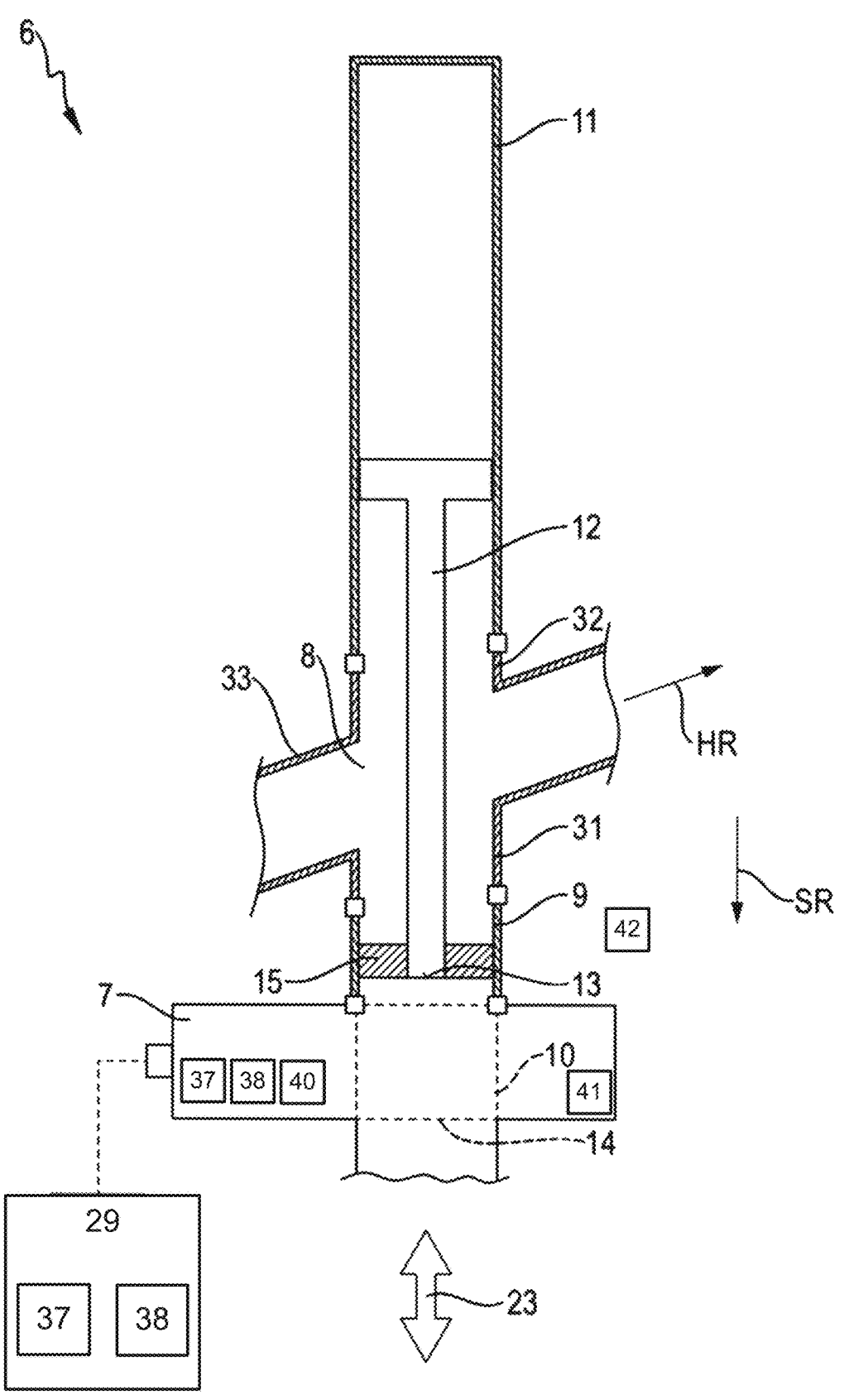
FIG. 4 shows a schematic front view of the bypass device in which a piston rod is visible.

FIG. 2 shows a front view of a bypass device 6, and FIG. 3 shows a rear view of the bypass device 6. FIG. 4 shows a schematic front view of a partial area of the bypass device 6, wherein a piston rod 12 is visibly shown.

The components of the bypass device 6 may be arranged or positioned and/or fixed on a base plate 21 of the bypass device 6. In one or some embodiments, the base plate 21 of the bypass device 6 has a feed opening 16 through which the partial flow of harvested material flows into the bypass device 6 starting from the grain elevator 3. In one or some embodiments, the bypass device 6 has a screw conveyor 8 and a collecting container 19, wherein the collecting container 19 is formed and/or arranged or positioned between the feed opening 16 and the screw conveyor 8 in such a way that the partial flow of harvested material flows from the feed opening 16 into the collecting container 19 and subsequently flows from the collecting container 19 into the screw conveyor 8. For this purpose, the feed opening 16 may be arranged or positioned above a part of the screw conveyor 8 so that the partial flow of harvested material flows substantially along the direction of gravity SR under the force of gravity and flows into the screw conveyor via an inflow opening (shown generally at arrow 39).

In one or some embodiments, the bypass device 6 has at least one capacitive measuring device 34 configured to determine one or more harvested material properties of the partial flow of harvested material. The capacitive measuring device 34 may be arranged or positioned in and/or on the collecting container 19. The bypass device 6 may have a fill level sensor unit 43 configured to detect the fill level of the partial flow of harvested material in the collecting container 19. This fill level sensor unit 43 may be formed at the same position with respect to the direction of gravity SR, or above the capacitive measuring device 34 of the bypass device 6. The collecting container may have an at least sectional channel taper 35 between the feed opening 16 and the screw conveyor 8, wherein the capacitive measuring device 34 of the bypass device 6 is arranged or positioned in and/or on the channel taper 35 of the collecting container 19.

In one or some embodiments, the screw conveyor 8 is designed to convey the partial flow of harvested material to an optical measuring device 7 of the bypass device 6. In one or some embodiments, the screw conveyor 8 has a tubular body 33 extending along the conveying direction 22. Further, the screw conveyor 8 may have a drive 20, which may be configured to drive screw windings rotatably mounted in the tubular body 33 and not shown. By the rotational movement of the screw windings, the partial flow of harvested material that has entered in the screw conveyor 8 is transported in the direction of the main conveying direction HR in order to supply the optical measuring device 7 with the partial flow of harvested material. For this purpose, the tubular body 33 may have a first transverse tube 31, wherein the tubular body 33 and the transverse tube 31 may in one embodiment be formed as one piece. A feed tube 9 for guiding the partial flow of harvested material from the screw conveyor 8 to the optical measuring device 7 may be arranged or positioned on the transverse tube 31 which has an outflow opening. In one or some embodiments, the optical measuring device 7 has a tube 10 for guiding the partial flow of harvested material, so that the determination and/or measurement of harvested material properties of the partial flow of harvested material may be performed.

The optical measuring device 7 may include computational functionality, one example of which is at least one processor 37 and at least one memory 38. The computing functionality of the optical measuring device 7 may be used, for example, to determine any one, any combination, or all of: the water mass; the protein mass; the carbohydrate mass; the fat mass; or the oil mass of the partial flow of harvested material. For this purpose, the optical measuring device 7 has a light source 40 which illuminates the partial flow of harvested material as it flows through the optical measuring device 7. In one or some embodiments, the optical measuring device 7 includes one or more sensors 41 that is configured to detect mass-proportional absorption spectra (which is one example of measurement data). The optical measuring device 7 is further configured to determine one or more aspects of the partial flow of harvested material (e.g., any one, any combination, or all of: the water mass; the protein mass; the carbohydrate mass; the fat mass; or the oil mass of the partial flow of harvested material) with reference to these measurement data.

In one or some embodiments, the bypass device 6 is configured to clean the tube 10 of the optical measuring device 7 and to ensure an empty state (or a substantially empty state) of the tube 10 of the optical measuring device 7, wherein the bypass device 6 may have a single cylinder device 11 for this purpose with a movable piston rod 12 for cleaning the tube 10 of the optical measuring device 7 (e.g., using motor 42 to move piston rod), and for ensuring an empty state (or a substantially empty state) of the tube 10 of the optical measuring device 7. The piston rod 12 may be moved along the direction of movement 23. In this embodiment, the direction of movement 23 of the piston rod 12 need not be aligned perpendicularly to the conveying direction 22 of the screw conveyor 8 so that the piston rod 12 may be guided at least partially through the tubular body 33 and/or positioned at least partially in the tubular body 33. For this purpose, the tubular body 33 may have a second transverse tube 32. In one or some embodiments, the tubular body 33 and the second transverse tube 32 are formed as one piece. The first transverse tube 31 and the second transverse tube 32 may be positioned on the tubular body 33 such that the piston rod 12 may move from the first transverse tube 31 to the second transverse tube 32, or vice versa. In this regard, it is contemplated that the screw conveyor 8 stops conveying, and, for example, the position of the screw windings (not shown) is aligned such that the piston rod 12 may be moved without friction between the screw windings of the screw conveyor 8.

At least a part of the piston rod 12, such as an end face 13 of the piston rod 12, may assume at least one opening position in which the screw conveyor 8, the feed tube 9 and the tube 10 are connected to each other for guiding the partial flow of harvested material in such a way that a partial flow of harvested material conveyed by the screw conveyor 8 substantially flows into the feed tube 9 and subsequently flows through the tube 10.

In one or some embodiments, the screw conveyor 8 may have an intermediate opening 18 formed downstream from the discharge opening with respect to the main conveying direction HR, wherein part of the partial flow of harvested material which has not flowed into the discharge opening may flow back into the grain elevator 3 via this intermediate opening 18.

The piston rod 12, in particular the end face 13 of piston rod 12, may assume at least one intermediate position in which at least a part of the piston rod 12 suppresses the partial flow of harvested material from the screw conveyor 8 to the tube 10, so that a partial flow of harvested material originating from the screw conveyor 8 does not flow into the tube 10 of the optical measuring device 7. This situation is illustrated in FIG. 4. For this purpose, the piston rod 12 may have, for example, a cleaning element 15, such as a brush-like cleaning element 15.

At least a part of the piston rod 12, such as the end face 13 of the piston rod 12, may assume at least one end position in which at least a part of the piston rod 12 is arranged or positioned in an end opening 14 of the tube 10 of the optical measuring device 7. The bypass device 6 has an outlet opening 17 through which the partial flow of harvested material may flow into the grain elevator 3 after flowing through the optical measuring device 7.

As shown in FIG. 3, the feed opening 16, the outlet opening 17 and the intermediate opening 18 may each form and/or has an opening and/or hole in the base plate 21.

In one or some embodiments, the optical measuring device 7 is configured to determine whether cleaning and/or referencing is required or warranted. Responsive to the optical measuring device 7 determining that cleaning and/or reference are required or warranted, the optical measuring device 7 may transmit a cleaning data signal (responsive to determining to clean) and/or a referencing data signal (responsive to determining to reference) to the self-propelled combine 1, such as to a control unit 29 of the combine 1. In one embodiment, control unit 29 resides within computing unit 28 (e.g., control unit 29 using the same processor 37 and memory 38). Alternatively, control unit 29 is external to computing unit 28 (e.g., control unit 29 using a different processor 37 and a different memory 38). Responsive to receiving the cleaning signal and/or the referencing signal (e.g., the processor 37 of the control unit receives the cleaning signal and/or the referencing signal), the self-propelled combine 1, such as the control unit 29 of the combine 1, performs a cleaning of the optical measuring device 7 using the bypass device 6 and/or enables a referencing of the optical measuring device 7 by preventing the inflow of the partial flow of harvested material into the optical measuring device 7. For example, the control unit may send command(s) to control and/or configure the bypass device 6, such as by controlling motor to move the piston rod 12, to clean the optical measuring device 7 and/or to prevent the inflow of the partial flow of harvested material into the optical measuring device 7 to reference the optical measuring device 7.

When the optical measuring device 7 transmits a cleaning signal, the piston rod 12 is moved to the end position to effect cleaning of the optical measuring device 7, such as the tube 10 (e.g., control unit sending one or more commands).

Responsive to the optical measuring device 7 transmitting the referencing signal, the piston rod 12 is controlled in such a way that the piston rod 12 is positioned in an intermediate position so that the partial flow of harvested material cannot flow into the tube 10 of the optical measuring device 7. This state is illustrated in FIG. 4.

If the optical measuring device 7 does not transmit a cleaning signal and a referencing signal, the piston rod 12 is controlled in such a way that the piston rod 12 is positioned in an opening position, so that a partial flow of harvested material conveyed by the screw conveyor 8 may substantially flow into the feed tube 9 and subsequently flows through the tube 10. In so doing, it may be provided that the screw conveyor 8 starts conveying the partial flow of harvested material when the piston rod 12 has assumed an opening position.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Combine
2 Harvested material
3 Grain elevator
4 Conveying and cleaning device
5 Grain tank
6 Bypass device
7 Optical measuring device
8 Screw conveyor
9 Feed tube 10 Tube
11 Cylinder device
12 Piston rod
13 End face
14 End opening
15 Cleaning element
16 Feed opening
17 Outlet opening
18 Intermediate opening
19 Collecting container
20 Drive
21 Base plate
22 Delivery direction
23 Direction of movement
24 Cutting unit
25 Inclined conveyor
26 Threshing unit
27 Separator
28 Computing unit
29 Control unit
30 Screen
31 First transverse tube
32 Second transverse tube
33 Tube body
34 Capacitive measuring device
35 Channel taper
36 Yield measuring device
37 Processor
38 Memory
39 Inflow opening
40 Light source
41 Sensor
42 Motor
43 Fill level sensor unit
FR Direction of travel
SR Direction of gravity
HR Main conveying direction

The invention claimed is:

1. A self-propelled combine configured to collect and handle harvested material, the combine comprising:

a grain elevator configured to convey a flow of harvested material from a conveying and cleaning device of the combine to a grain tank of the combine; and a bypass device positioned at or relative to the grain elevator and configured to guide a partial flow of harvested material that is a part of the flow of harvested material that is guided through the grain elevator, the bypass device comprising an optical measuring device configured to determine one or more harvested material properties of the partial flow of harvested material and including at least one capacitive measuring device configured to determine the one or more harvested material properties of the partial flow of harvested material;

wherein the bypass device includes one or more of:

a feed opening through which the partial flow of harvested material from the grain elevator is configured to flow into the bypass device;

an outlet opening through which the partial flow of harvested material is configured to flow into the grain elevator after flowing through the optical measuring device; or an intermediate opening through which the partial flow of harvested material is configured to flow into the grain elevator;

wherein the bypass device includes a collecting container configured to collect the partial flow of harvested material;

wherein the bypass device includes a screw conveyor configured to convey the partial flow of harvested material to the optical measuring device; and wherein the collecting container is formed between the feed opening and the screw conveyor.

2. The self-propelled combine of claim 1, wherein the bypass device includes a collecting container configured to collect the partial flow of harvested material; and wherein the at least one capacitive measuring device is positioned one or both of in or on the collecting container.

3. The self-propelled combine of claim 2, wherein the collecting container has at least one fill level sensor unit configured to detect fill level of the partial flow of harvested material in the collecting container.

4. The self-propelled combine of claim 1, further comprising a yield measuring device configured to measure yield of the flow of harvested material; and wherein the yield measuring device is positioned one or both of in or on the grain elevator and is positioned at a predetermined distance from the bypass device.

5. The self-propelled combine of claim 4, wherein the yield measuring device is positioned between the bypass device and the grain tank.

6. The self-propelled combine of claim 4, wherein the yield measuring device is one of:

an optical yield measuring device;

a force-based yield measuring device; or a capacitive measuring device.

7. The self-propelled combine of claim 1, wherein the bypass device includes a screw conveyor configured to convey the partial flow of harvested material to the optical measuring device.

8. The self-propelled combine of claim 1, wherein the collecting container has an at least sectional channel taper between the feed opening and the screw conveyor.

9. The self-propelled combine of claim 8, wherein the at least one capacitive measuring device of the bypass device is positioned one or both of in or on the channel taper of the collecting container.

10. The self-propelled combine of claim 1, wherein the optical measuring device is configured to determine one or more constituents of the partial flow of harvested material.

11. The self-propelled combine of claim 1, wherein the optical measuring device of the bypass device is configured to determine a moisture value of the partial flow of harvested material;

wherein the at least one capacitive measuring device is configured to determine an electrical capacitance of the partial flow of harvested material; and further comprising a controller configured to:

access the moisture value and the electrical capacitance; and determine a weight of the partial flow of harvested material.

12. A self-propelled combine configured to collect and handle harvested material, the combine comprising:

a grain elevator configured to convey a flow of harvested material from a conveying and cleaning device of the combine to a grain tank of the combine; and a bypass device positioned at or relative to the grain elevator and configured to guide a partial flow of harvested material that is a part of the flow of harvested material that is guided through the grain elevator, the bypass device comprising an optical measuring device configured to determine one or more harvested material properties of the partial flow of harvested material and including at least one capacitive measuring device configured to determine the one or more harvested material properties of the partial flow of harvested material;

wherein the bypass device includes each of:

a feed opening through which the partial flow of harvested material from the grain elevator is configured to flow into the bypass device;

an outlet opening through which the partial flow of harvested material is configured to flow into the grain elevator after flowing through the optical measuring device; and an intermediate opening through which the partial flow of harvested material is configured to flow into the grain elevator.

13. The self-propelled combine of claim 12, wherein the bypass device includes a collecting container configured to collect the partial flow of harvested material;

wherein the bypass device includes a screw conveyor configured to convey the partial flow of harvested material to the optical measuring device; and wherein the collecting container is formed between the feed opening and the screw conveyor.

14. The self-propelled combine of claim 13, wherein the collecting container has an at least sectional channel taper between the feed opening and the screw conveyor.

15. The self-propelled combine of claim 14, wherein the at least one capacitive measuring device of the bypass device is positioned one or both of in or on the channel taper of the collecting container.

16. A method for operating a self-propelled combine that includes a grain elevator that conveys a flow of harvested material from a conveying and cleaning device of the combine to a grain tank of the combine, and a bypass device positioned at or relative to the grain elevator and that guides a partial flow of harvested material that is a part of the flow of harvested material that is guided through the grain elevator, the method comprising:

determining, using an optical measuring device of the bypass device, a moisture value of the partial flow of harvested material of the bypass device;

determining, using a capacitive measuring device of the bypass device, an electrical capacitance of at least a part of the partial flow of the harvested material; and determining, based on the moisture value and the electrical capacitance, a weight of the partial flow of harvested material of the bypass device;

wherein the bypass device includes one or more of:

a feed opening through which the partial flow of harvested material from the grain elevator is configured to flow into the bypass device;

an outlet opening through which the partial flow of harvested material is configured to flow into the grain elevator after flowing through the optical measuring device; or an intermediate opening through which the partial flow of harvested material is configured to flow into the grain elevator;

wherein the bypass device includes a collecting container that collects the partial flow of harvested material;

wherein the bypass device includes a screw conveyor that conveys the partial flow of harvested material to the optical measuring device; and wherein the collecting container is formed between the feed opening and the screw conveyor.

17. The method of claim 16, wherein one or both of determining the moisture value of the partial flow of harvested material or determining the electrical capacitance of the capacitive measuring device is performed continuously during operation of the combine.

18. The method of claim 16, wherein a hectoliter weight of the partial flow of harvested material is determined by one or more of:

incorporating the moisture value and the electrical capacitance linearly;

incorporating the moisture value and the electrical capacitance quadratically; or using the moisture value, the electrical capacitance, and a plurality of harvested material-dependent prefactors.

19. The method of claim 16, wherein in an event of failure of the optical measuring device of the bypass device, the moisture value of the partial flow of harvested material is determined using the capacitive measuring device of the bypass device.

20. The method of claim 16, wherein the weight comprises a hectoliter weight.

\* \* \* \* \*